Aug. 31, 1948.   W. H. ELLIOT   2,448,256
ELECTRONIC MOTOR CONTROL FOR PRINTING
PRESSES AND THE LIKE
Filed April 9, 1945   2 Sheets-Sheet 2
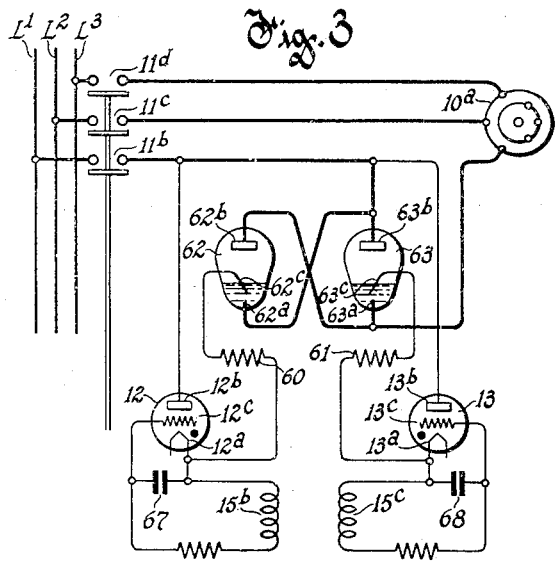
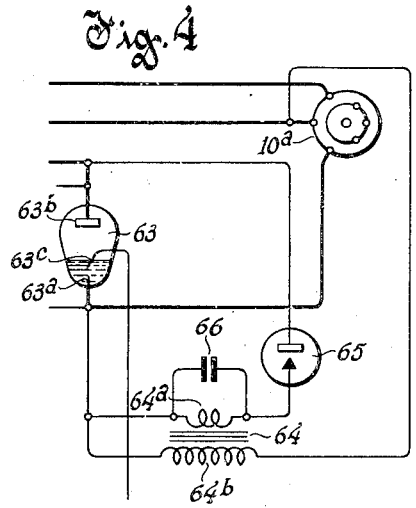
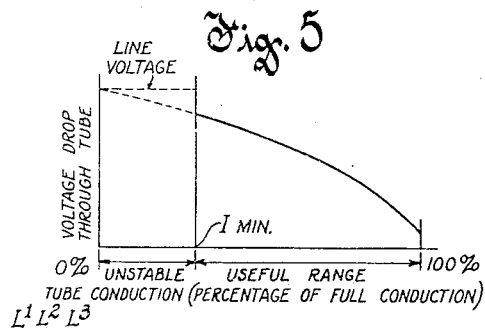
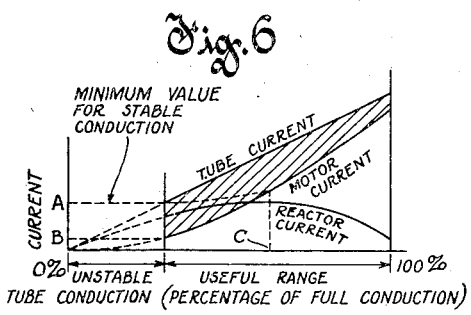
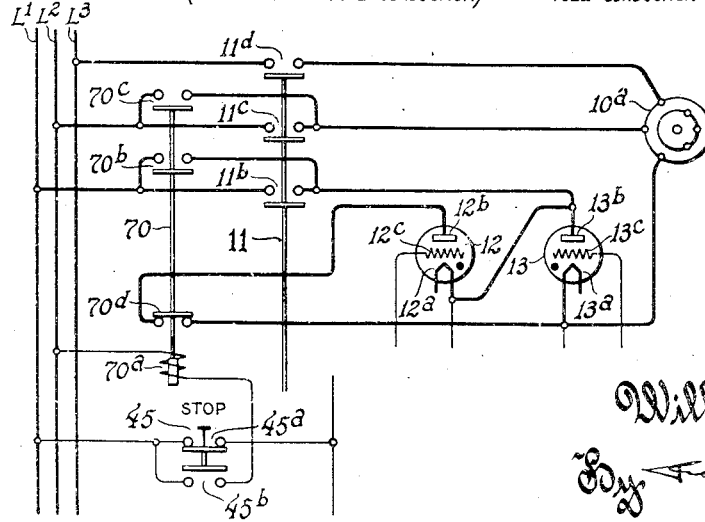
Inventor
William H. Elliot
By [signature]
Attorney Patented Aug. 31, 1948

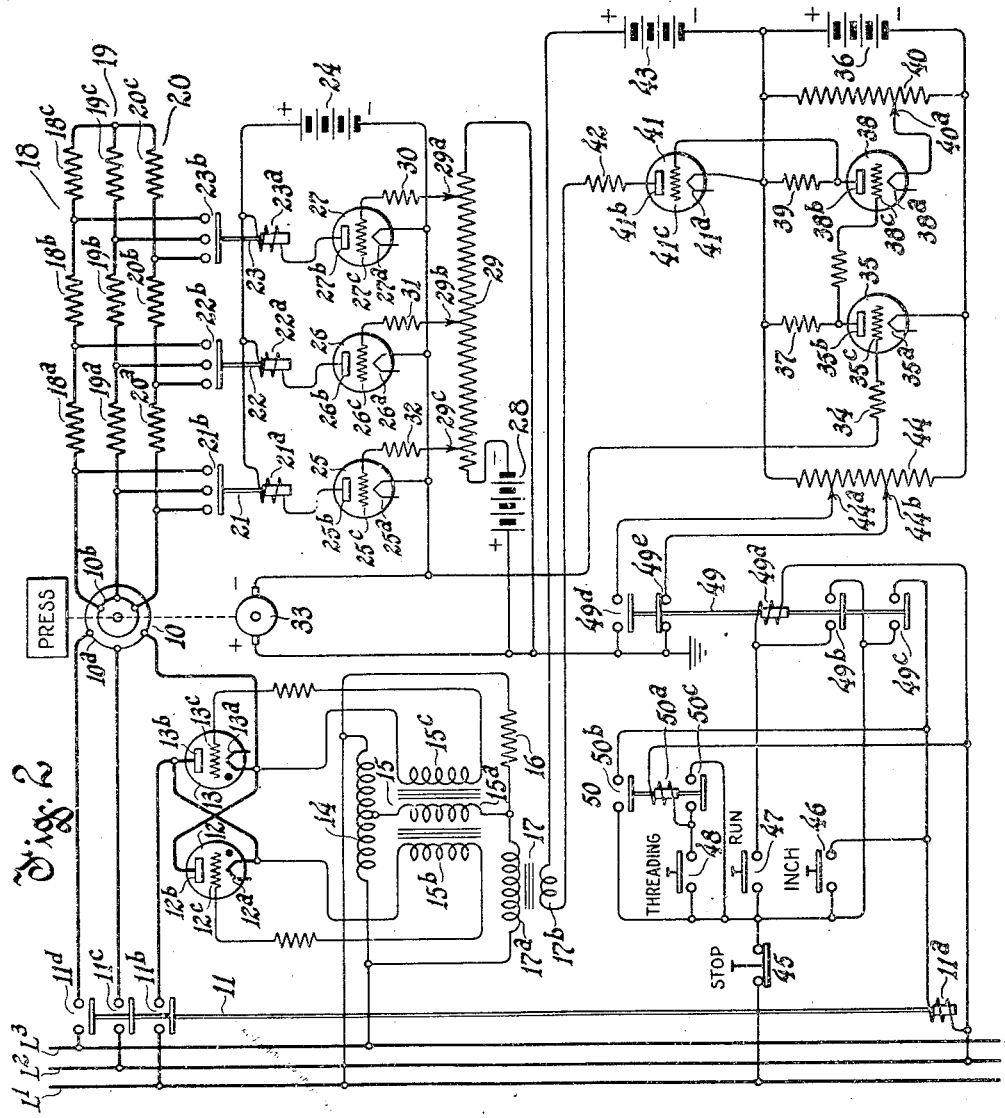

2,448,256

UNITED STATES PATENT OFFICE 2,448,256

ELECTRONIC MOTOR CONTROL FOR PRINTING PRESSES AND THE LIKE

William H. Elliot, Shorewood, Wis., assignor to Cutler-Hammer, Inc., Milwaukee, Wis., a corporation of Delaware Application April 9, 1945, Serial No. 587,245

15 Claims. (Cl. 318—212)

The invention relates to the control of alternating current motors and, while not limited thereto, it is especially suitable for the automatic speed control of polyphase induction motors, and, more particularly, motors of the slip-ring type.

The speed of slip-ring type motors, which are required to exert a relatively constant torque, may be varied between zero and synchronous speed by varying the resistance in the secondary circuit. As the commutation of the secondary resistance involves mechanical elements having inertia and electrical circuits having inductance, such speed control is not suitable when the torque required of the motor varies rapidly, as for any given adjustment of the secondary resistance the speed varies substantially inversely as the torque. Furthermore, if the torque required under certain operating conditions is only a small fraction of the normal torque of the motor, while at the same time the speed required is only a small fraction of the normal speed, and at other times the speed and the corresponding torque are high, the material required for the secondary resistance and the amount of apparatus for commutating such resistance become abnormally high and complicated. It has therefore become customary under these conditions to employ special means such as multi-speed motors with a plurality of primary and/or secondary windings or two separate motors, one for the high speeds and torques and the other for the low speeds and low or high torques. Where two motors are employed, the motor for the low speed may be geared down so as to afford high torque with a small motor.

The present invention obviates the aforementioned disadvantages. It employs a system which, operating with a single standard induction motor, affords accurate maintenance of any desired speed between zero and maximum speed for any load between zero and the maximum torque which the motor is capable of exerting and irrespective of the rapidity of variations of the load imposed upon the motor.

A preferred form of the system embodying the present invention employs a three-phase slip-ring type induction motor which is provided with a commutatable secondary resistor and with a variable impedance in one of the three lines to the primary terminals of the motor. By increasing this impedance, the primary magnetic field of the motor becomes unbalanced and this results in a reduction in the torque exerted by the motor, such reduction varying with the amount of unbalance.

Figure 1 of the accompanying drawings illustrates the relation of the phase currents supplied to an induction motor and the torque exerted by the latter. The diagram illustrates stalled characteristics for an induction motor having a given secondary resistance and it will be noted that when the currents of the three phases are balanced the torque is a maximum, whereas the torque decreases with the unbalancing of the phase currents and becomes zero when the current in one of the phases is zero.

As shown by the diagram, the current $I^3$ in phase 3 is gradually reduced from its maximum value to zero. When the current in phase 3 is a maximum, the currents $I^1$ and $I^2$ in phases 1 and 2, respectively, are also a maximum and equal to the current in phase 3. As the current in phase 3 is reduced, the currents in phases 1 and 2 remain substantially constant, although they slightly differ from each other due to the dissymmetry created by the unbalancing. When the current in phase 3 is zero, the currents in phases 1 and 2 are again equal to each other and substantially equal to the current obtaining when the phases are balanced. Similar conditions to those described obtain with any adjustment of the secondary resistance except that the primary current values are proportionally increased or decreased, and the same relation holds true for various speeds especially for very low speeds of the motor. At higher speeds, the conditions are somewhat modified due to the counter-magnetomotive forces of the rotating secondary winding. However, the present control of the impedance in one line to a polyphase motor is primarily of interest in connection with a high secondary resistance for the attainment and regulation of a low speed with varying torque. The variable impedance may be an electron tube or tubes, the impedance of which is controlled by means of a voltage impressed upon the control electrode of the tube. The invention will be more fully explained in connection with the accompanying drawings which illustrate an embodiment of the invention for the control of a three-phase induction motor driving a printing press or the like, and which is required to operate at adjustable relatively high speeds at normal torques, must start with a relatively high torque and for threading the paper into the machine must be operable at a very low speed requiring a relatively high torque.

The present invention has for one of its objects to provide special means which afford a wide range in speed and simultaneously a wide range in torque with a single motor.

Another object of the invention is to provide speed regulating means which are rapid in response to varying conditions in load.

Another object is to provide means affording in an induction motor drive low stable speeds for rapidly varying loads on the motor.

Another object is to provide a single motor drive affording high torques up to the maximum motor torque at very low constant speed.

Another object is to provide means for quick stoppage of an alternating current motor by dynamic braking.

Another object is to provide in a system of the aforementioned type a regulating impedance which is continuously variable between substantially zero and infinity.

Another object is to provide means affording stable operation of a gaseous tube at relatively low load currents, without affecting its ultimate load current carrying capacity.

The drawings in addition to Fig. 1, which has already been described, include the following:

Fig. 2, illustrating a motor control system employing grid-controlled gaseous tubes to control the motor primary current;

Fig. 3 which is a modification of the system of Fig. 2, employing ignitrons to carry the primary current;

Fig. 4 which is a modification of the system of Fig. 2 and Fig. 3;

Figs. 5 and 6 which illustrate certain characteristics of the modifications of Figs. 3 and 4, respectively, while Fig. 7 which illustrates another modification of the systems shown in Figs. 2, 3 or 4.

Referring to Fig. 2, the same illustrates an induction motor 10, having a three-phase primary winding 10$^a$ and a three-phase secondary winding 10$^b$. The primary winding is connectable to the bus bars L$^1$, L$^2$, and L$^3$ of a three-phase source of supply through an electromagnetic switch 11, having an energizing winding 11$^a$, and normally open main contacts 11$^b$, 11$^c$, and 11$^d$. The contacts 11$^d$ connect the bus bar L$^3$ to one terminal of the winding 10$^a$. The contacts 11$^c$ connect the bus bar L$^2$ to another terminal of winding 10$^a$ while the contacts 11$^b$ are connected between the bus bar L$^1$ and the cathode 12$^a$ of a gaseous electron tube 12. A gaseous tube 13 has an anode 13$^b$ which is connected to the cathode 12$^a$ and a cathode 13$^a$ which is connected to the anode 12$^b$ of the tube 12. The tubes 12 and 13 are also provided with control electrodes 12$^c$ and 13$^c$, respectively. Connected across the lines L$^1$, L$^3$ is a center tapped impedance 14. The center tap of the impedance 14 is connected to one terminal of said primary winding 15$^a$ of a transformer 15. The other terminal of said primary winding 15$^a$ is connected to one of the end terminals of the impedance 14 through a resistor 16, and is also connected to the other end terminal of the impedance 14 through the winding 17$^a$ of a saturable reactor 17 which is also provided with a saturating winding 17$^b$. The transformer 15 is also provided with secondary windings 15$^b$ and 15$^c$. The winding 15$^b$ is connected between the cathode 12$^a$ and the control electrode 12$^c$ while the winding 15$^c$ is connected between the cathode 13$^a$ and the control electrode 13$^c$.

The secondary winding 10$^b$ of the motor 10 is connected to resistors 18, 19, and 20, one terminal of each resistor being connected to one phase of each of the winding 10$^b$, while the other terminals of said resistors are connected together to form a star or neutral point. Each resistor is divided into three sections 18$^a$, 18$^b$, 18$^c$, 19$^a$, 19$^b$, and 19$^c$, and 20$^a$, 20$^b$, and 20$^c$, respectively. The three terminals of the motor winding 10$^b$ are connected to the three contacts 21$^b$ of a triple contact switch 21 which also has an energizing winding 21$^a$. Similarly, the intermediate taps between the resistors 18$^a$, 18$^b$; 19$^a$, 19$^b$; 20$^a$, 20$^b$ are connected to the three poles of a triple contact 22$^b$ of an electromagnetic switch 22 having an energizing winding 22$^a$ and the common terminals of the resistors 18$^b$ and 18$^c$, 19$^b$ and 19$^c$, and 20$^b$ and 20$^c$ are each connected to one of the terminals of a triple contact switch 23$^b$ of an electromagnetic switch 23 which is also provided with an energizing winding 23$^a$. One terminal of the windings 21$^a$, 22$^a$, and 23$^a$ is connected to the positive terminal of a direct current source 24 while the other terminals of said windings are connected to the anodes 25$^b$, 26$^b$, and 27$^b$ of electron tubes 25, 26, and 27, respectively. These electron tubes are also provided with cathodes 25$^a$, 26$^a$, and 27$^a$, respectively, connected to the negative terminal of the voltage source 24 and with control electrodes 25$^c$, 26$^c$, and 27$^c$, respectively. A voltage dividing resistor 29 is connected between the positive and negative terminals of a second direct current voltage source 28. The control electrode 27$^c$ is connected in series with a current limiting resistor 30 to an adjustable contact 29$^a$ of the voltage divider 29. The control electrode 26$^c$ is connected through a current limiting resistor 31 to a movable contact 29$^b$ of the voltage divider 29, while the control electrode 25$^c$ is connected through a current limiting resistor 32 to a third movable contact 29$^c$ of said voltage divider 29.

Arranged so as to rotate with the armature of the motor 10 is a tachometer generator 33, the output voltage of which is proportional to the speed of the motor 10. The tachometer 33 may be of any suitable type yielding a unidirectional voltage. The diagram shows a tachometer generator which may be of the permanent magnet type or which may be provided with a separately excited field winding (not shown).

The negative terminal of the generator 33 is connected through a current limiting resistor 34, to the control electrode 35$^c$ of an electron tube 35 which is also provided with a cathode 35$^a$ and an anode 35$^b$. The cathode 35$^a$ and anode 35$^b$ are connected to the negative and positive terminals respectively, of a direct current voltage source 36, the connection of the anode being through a resistor 37. The anode 35$^b$ is also connected through a current limiting resistor to the control electrode 38$^c$ of an electron tube 38 which is also provided with an anode 38$^b$ connected through a resistor 39 to the positive terminal of the source 36 and with an anode 38$^a$ which is connected to the movable contact 40$^a$ of a voltage dividing resistor 40. The resistor 40 is connected across the terminals of the source 36. The anode 38$^b$ is directly connected to the control electrode 41$^c$ of an electron tube 41, which is also provided with a cathode 41$^a$ connected to the positive terminal of the voltage source 36 and with an anode 41$^b$ connected through a resistor 42 to one terminal of the winding 17$^b$ of saturable reactor 17. The second terminal of the winding 17$^b$ is connected to the positive pole of a direct current voltage source 43. The negative terminal of said voltage source 43 is connected to the positive terminal of the voltage source 36. Connected across the terminals of the source 36 is a voltage dividing resistor 44 which is provided with adjustable contacts 44a and 44b.

To enable the press to be operated under different conditions the system further includes a normally closed stop push button switch 45 and normally open inching, running, and threading push button switches 46, 47 and 48, respectively. There is further provided a "running" electromagnetic relay 49, having an energizing winding 49a, normally open contacts 49b, 49c, and 49d and normally closed contacts 49e and a "threading" relay 50 having an energizing winding 50a and normally open contacts 50b and 50c.

A circuit extends from line L¹ to one terminal of the push button switch 45. The other terminal of switch 45 is connected to one terminal of each of the push button switches 46, 47 and 48 and also to one terminal of the contacts 50b, 50c, 49b, and 49c. The second terminal of contacts 46, 50b, and 49c are jointly connected to one terminal of the energizing winding 11a, the second terminal of which is connected to the line L². The second terminal of contact 50c is connected to the second terminal of switch 48 and to one terminal of the winding 50a. The second terminal of the winding 50a is connected to the line L². The second terminal of the contact 47 is connected to one terminal of the winding 49a and to the second terminal of contact 49b. The second terminal of the winding 49a is connected to line L². The positive terminal of the tachometer 33 is connected to one terminal of each of the contacts 49d and 49e. The second terminal of the contact 49d is connected to the adjustable contact 44a while the second terminal of the contact 49e is connected to the adjustable contact 44b.

The system thus far desribed and illustrated in Fig. 2 operates in the following manner: If the lines L¹, L², L³ are energized and it is desired to start the press for running at full speed, the push button switch 47 is momentarily closed, thereby establishing a circuit from line L¹ over contacts 45, 47, through winding 49a to line L². Thereupon the relay 49 responds and closure of its contacts 49b establishes a maintaining circuit in parallel with switch 47 so that switch 47 may be released and relay 49 remains energized. The relay 49 also closes contacts 49c which completes the energizing circuit of winding 11a and the main switch 11 is actuated. Closure of contacts 11b connects the line L¹ to the anode 13b and cathode 12a and thus one terminal of primary winding 10a to line L¹. Closure of contacts 11c and 11d connects the other two terminals of the motor winding 10a to the lines L² and L³, respectively. The motor thereupon begins to revolve and generates voltage in the tachometer 33.

As is well understood, the conduction of the gaseous tubes 12 and 13 is determined by the moment at which, during the respective positive half-cycle, the tube ignites and this in turn is determined by the phase relation of the corresponding grid potential relative to the line voltage impressed upon said tubes. With the equipment standing still, the current passing through the saturating winding 17b is a maximum, as will be hereinafter explained, with the result that the phase angle between the voltage impressed on tubes 12 and 13 and the voltage induced in the windings 15b and 15c due to the voltage obtaining in the winding 15a is a minimum and the tubes are therefore conducting during substantially their entire respective positive half-cycle.

The voltage impressed on the control electrode 35c by the voltage divider 44 is of sufficiently high positive value with respect to the cathode 35a to render the tube 35 highly conducting while no opposing voltage is supplied through the generator 33 as long as the latter is standing still. The high current flowing through the tube 35 produces a relatively high voltage drop through the resistor 37 so that the tube 38 by virtue of its low grid potential has a relatively low conductivity which in turn produces a relatively low potential drop through the resistor 39 to render the control electrode 41c only slightly negative with respect to the cathode 41a and this in turn causes a relatively high current to flow from the positive terminal of the voltage source 43 through the saturating winding 17b, resistor 42, through the tube 41 to the negative terminal of the battery 43. Thus the reactor 17 is highly saturated and the current through the winding 17a is large, thereby affording a voltage in the winding 15a of transformer 15 and corresponding voltages in the windings 15b and 15c which are substantially in phase with the voltage impressed upon the tubes 12 and 13. As a result the motor receives a high current from the line and accelerates.

The voltages impressed upon the control electrodes of the tubes 25, 26, and 27 are adjusted for progressively less negative biases with respect to the corresponding cathodes. As the motor accelerates, these negative voltages are counteracted by an opposing supplemental voltage generated by the tachometer 33 so that ultimately with increasing speed the negative potentials of the control electrodes aforementioned progressively change toward positive values and the tubes 27, 26, and 25 become successively sufficiently conductive to raise the energizing current of the coils 23a, 22a, and 21a to a value sufficient to close the contacts 23b, 22b and 21b thereby successively cutting out steps of resistance in the secondary circuit of the motor to accelerate the same.

As the speed of the motor increases, the tachometer 33 also supplies a supplemental voltage to the grid 35c which is opposed to the voltage supplied by the voltage divider 44 with the result that with increasing speed of the motor the tube 35 becomes less conducting thus increasing the conduction of the tube 38 which in turn decreases the conduction of the tube 41 and thereby decreases the current in the winding 17b. The decrease of the current in the winding 17b reduces the saturation of the reactor 17 thereby decreasing the current through the winding 17a. This increases the retardation of the phase angle of the voltages in the windings 15a, 15b, and 15c with respect to the voltage of the lines L¹, L², and L³ and thereby retards the moment of ignition during the respective positive half cycles of the tubes 12 and 13 and thus reduces the effective current supplied to one phase of the winding 10a of the motor so as to maintain the speed of said motor at a constant value, determined by the adjustment of the sliding contacts 44a and 40a.

If the press is to be stopped, it is merely necessary to operate the stop push button 45. This interrupts the current supplied to the energizing winding of the relay 49 and the relay opens its maintaining circuit and also opens the energizing circuit of the electromagnetic switch winding 11a thus disconnecting the motor from the line and bringing the equipment back to its initial condition.

If it is desired to inch the press, that is, to rotate it step by step, by momentarily supplying current to the motor, the inch button 46 is depressed. This completes the energizing circuit of the electromagnetic main switch 11 from line L¹ through switch contacts 45 and 46 through the energizing winding 11ᵃ to line L² and the motor primary winding 10ᵃ is again connected to the line as aforedescribed. The motor will turn over and if it attains a sufficient speed the accelerating switches 21, 22, and 23 operate in the manner aforedescribed. However, for inching, it is usually desired that the speed which the motor attains be limited to a very low value. Therefore, biasing voltage which is impressed upon the control electrode 35ᶜ is adjusted to a lower value than for starting and running at full speed. This is accomplished by interrupting the circuit from the positive terminal of the tachometer 33 through the normally open contacts 49ᵈ to the sliding contact 44ᵃ and completing a circuit from the positive terminal of the tachometer 33 through the contacts 49ᵉ to the adjustable contact 44ᵇ, the relay 49 not being energized upon the depression of the inching button 46. Thus by adjusting the contact 44ᵇ, the conduction of the tube 35 may be adjusted for the maximum speed which the motor may attain upon depression of the inching button 46. This speed may be only a small percentage of the full load speed of the motor and may be insufficient to cause closure of any of the accelerating switches 21ᵇ, 22ᵇ and 23ᵇ.

If it is desired to operate the press at a low threading speed, the slow push button switch 48 is closed. This energizes the winding 50ᵃ by a circuit from line L¹ through switches 45 and 48, the energizing winding 50ᵃ to the line L². The relay 50ᵇ responds to close a maintaining circuit through contact 50ᶜ which parallels the switch 48 so that the relay 50 remains energized when the push button 48 is released. At the same time the contact 50ᵇ is closed thereby completing the energizing circuit for the main switch 11ᵃ from line L¹ over contacts 45 and 50ᵇ, through the winding 11ᵃ to line L². The motor speed is controlled by controlling the moment of ignition of the tubes 12 and 13 in response to the voltage impressed upon the tube 35 by the voltage divider 44 and the tachometer 33 in the manner aforedescribed. As the relay 49 is deenergized, the grid 35ᶜ is now controlled by the setting of the contact 44ᵇ.

If the motor is to be stopped when running at threading speed, it is merely necessary to operate the push button switch 45, which opens the maintaining circuit of the relay 50 and this in turn deenergizes the electromagnetic switch 11 as will be apparent.

The system illustrated in Fig. 2 embodies grid-controlled gaseous discharge tubes 12 and 13 connected in series with the motor primary winding. Under certain conditions, especially for larger motors, it is desirable to use mercury pool tubes known as "ignitrons." In that case the system may be substantially the same as aforedescribed, except that the ignitrons are interposed in the motor circuit and are in turn controlled by thyratron tubes which are actuated in the manner aforedescribed.

Fig. 3 shows substantially only that part of the system which differs from that shown in Fig. 2. In the case of Fig. 3, the thyratron tubes control the ignitron circuit of the ignitrons and the latter are connected in series with the motor primary circuit. The thyratrons 12 and 13 respond to the control voltage impressed upon them by the secondary windings 15ᵇ and 15ᶜ of transformer 15, in the same manner as in the case of the system of Fig. 2, but they in turn control the ignition current of the ignitrons. The cathodes 12ᵃ and 13ᵃ of the thyratrons 12 and 13, respectively, are connected through current limiting resistors 60 and 61, respectively, to the ignitron electrodes 62ᶜ and 63ᶜ, respectively, of the corresponding ignitrons 62 and 63. The anode 63ᵇ of the ignitron 63 is connected to the thyratron anodes 12ᵇ and 13ᵇ, respectively. The anode 62ᵇ of ignitron 62 is connected to the cathode 63ᵃ and to one terminal of winding 10ᵃ. The cathode 62ᵃ is connected to the anode 63ᵇ and also through the contact 11ᵇ to the line L¹. It will be apparent that the current in the ignitrons is initiated at the moment when the corresponding thyratrons become conducting and the functioning of the system is in all other respects the same as has been explained in connection with Fig. 2.

It is well known that ignitrons will not operate successfully below a certain minimum current. Fig. 5 shows for a given load the voltage drop through an ignitron from zero conduction to conduction for practically the full time during which its anode potential is positive with respect to the cathode. It also shows the minimum current (I min.) below which the ignitron will not function successfully. From this it will be seen that if the external impedance in series with the ignitron is very high so that the current through the tube would be less than the aforestated minimum, the ignitron does not function successfully in response to the effect of its ignitron electrode. Such conditions may obtain when the load on a motor which is controlled by the ignitron is very low, so that it would be difficult if not impossible to obtain a very low creeping speed at low motor torques with the arrangement shown in Fig. 3.

Fig. 4 shows substantially only that part of the system which differs from that shown in Fig. 3. This arrangement provides for passing through the ignitron, in addition to the motor current, a supplemental current which together with the motor current maintains a sufficiently high current through the ignitron to cause it to function properly. This means consists of a saturable reactor 64, the alternating current winding 64ᵇ of which is connected in parallel with the motor winding between the cathode 63ᵃ of the ignitron 63 and the bus bar L² of Fig. 3. The saturating winding 64ᵃ of said reactor is connected in series with a rectifier 65, across the main electrodes of the ignitron 63. To smooth out the half-wave rectified current passing through the tube 65, a smoothing condenser 66 is connected across the terminals of the winding 64ᵃ. It will be seen that the current which passes through the winding 64ᵃ is a direct function of the voltage drop across the ignitron 63. Hence when the voltage drop of the ignitron is high, the current in said winding 64ᵃ is high, whereas when the voltage across the ignitron is low, the current in the winding 64ᵃ is low.

It is further known that the current in the winding 64ᵇ varies with the current in the winding 64ᵃ. The current in the winding 64ᵇ is added to the current flowing through the tube 63 to the corresponding terminal of the motor winding. Thus the total current flowing through the tube is the resultant of the motor current and the current flowing through the reactor winding 64b.

Referring to Fig. 6, the tube current is indicated by a substantially straight line. The minimum current at which the tube will operate consistently is indicated by the letter A. Without the current through the winding 64b this would also be the minimum current to the motor, and the range through which the tube could regulate the motor would be from the point C in the diagram to the full load or 100 per cent load current. As the tube current decreases, the voltage impressed upon the reactance winding 64a increases as indicated by Fig. 6, so that the current through the winding 64b at first also increases, but due to the increased voltage drop through the tube, the current in the winding 64b tends to decrease. As a result, a balance is obtained at a certain point between the saturating effect of the winding 64a and the effect of the voltage drop through the tube 63 upon the winding 64b. At that point the reactor current again decreases with decreasing tube current as shown in Fig. 6. Nevertheless, for the minimum tube current value A, the current through the reactor has still a substantial value so that the lower current B is available for the motor winding. Hence the reactor extends the range of control of the motor to a much lower value as indicated by the diagram, as the minimum current supplied to the motor is the minimum tube current less the current passing through the reactor.

It is thus apparent that by the addition of the saturable reactor, the reactance of which first decreases and thereafter again increases with decreasing motor current, the range of speed control by the tubes 62 and 63 can be correspondingly increased. In practice it has been found that the motor may be operated for threading at a speed as low as 1 per cent to 2 per cent of its synchronous speed.

Fig. 7 illustrates a modification of Fig. 2 for dynamic braking of the motor to obtain a quick stop. In addition to the apparatus shown in Fig. 2, the system is provided with an electromagnetic switch 70, having an energizing winding 70a, normally open contacts 70b and 70c, and normally closed contacts 70d. The contacts 70d are connected between the anode 12b and cathode 13a, while the contacts 70b and 70c are connected in parallel with the contacts 11b and 11c, respectively. The stop push button switch 45 of Fig. 2 is provided with additional normally open contacts 45b, which are closed upon depression of the push button and upon opening of the normally closed contacts 45a.

The modification shown in Fig. 7 operates in the following manner: If it is desired to stop the press after threading or running, the push button 45 is depressed, thereby disconnecting the motor from the line in the manner aforedescribed. But as long as the push button switch 45 is held down, the contacts 45b are closed, thereby establishing a circuit from line L¹, over contacts 45b through winding 70a to line L². This energizes the switch 70, thereby establishing a circuit from line L¹ through contacts 70b, tube 13, through the motor primary winding 10a, through contact 70c to line L², while the opening of the contacts 70d cuts the tube 12 out of circuit. As long as the motor rotates, it therefore acts as an alternating current generator, its energy being dissipated as heat generated by the currents induced in its secondary winding, thereby bringing the motor quickly to a stop.

It will be apparent that instead of providing the contacts 45b on the push button 45, a separate push button may be provided for the braking operation. It will also be apparent that the switch 70 may be employed in connection with the modifications of Figs. 3 and 4.

It will be obvious that instead of a single motor, a plurality of motors, whose primary terminals are connected in parallel, may be controlled jointly in the manner aforedescribed. It is further apparent that a single tachometer with a single set or a plurality of the aforedescribed associated regulating devices may be employed to jointly control a plurality of motors, each provided with an individual impedance device.

In some cases it may be desirable to pass only part of the motor primary current of one phase through the tubes 12 and 13 of Fig. 2 or the tubes 62 and 63 of the system illustrated in Fig. 3 for control by such tubes. In such event a suitable impedance may be connected in parallel with the respective tubes. With this arrangement only the component of the total current which passes through the tubes is subject to control thereby and the minimum current supplied to the motor is the current conducted by the impedance when the tubes have been rendered non-conducting by the influence of the controlling effect imposed thereon.

I claim:

1. A method of controlling, through control of a single line connection thereof, a polyphase translating device having all terminals connected to the lines of a polyphase supply circuit which comprises making said single connection dependent upon an electronic discharge produced therein and regulating half cycles of such discharge in respect of ratio of conduction and non-conduction during half cycles individually, thereby to afford different unbalanced conditions in the translating device in a stepless manner through a range which may extend from substantially balanced polyphase conditions to single phase conditions.

2. In a control system for a translating device, in combination, a source of polyphase current, a translating device having a polyphase winding including a plurality of terminals for connecting it to said source to receive current therefrom, space discharge means having a control element and being interposed between said source and one of said terminals, and means to impress upon said control element a potential varying in response to an operating characteristic of said device and regulating the ratio of conduction and nonconduction of said discharge means during individual half cycles to thereby afford, through potential regulation of a single terminal of the polyphase winding, current control through a range which may extend from substantially balanced polyphase condition of the translating device to single phase condition thereof.

3. In a printing press control system or the like, in combination, a source of polyphase current, a motor having a polyphase primary winding including a plurality of terminals for connecting it to said source, space discharge means having a control element and being interposed between said source and one of said terminals, and means to impress upon said control element a potential varying in response to the speed of said motor and regulating the ratio of conduction and nonconduction of said discharge means during individual half cycles to thereby afford, through potential regulation of a single terminal of the motor primary winding, motor control through a range which may extend from substantially balanced polyphase condition of the motor to single phase condition thereof.

4. In a printing press control system or the like, in combination, a source of polyphase current, a motor having a polyphase primary winding including a plurality of terminals for connecting it to said source, a space discharge device having a control element for varying its impedance interposed between said source and one of said terminals, means for impressing upon said control element an alternating potential whose frequency is that of said polyphase current, means affording a potential which varies with the speed of said motor, and means to superimpose a resultant of said varying potential upon said alternating potential to vary the impedance of said device in response to the speed of said motor to afford, through potential regulation of a single terminal of the motor primary winding, motor control through a range which may extend from substantially balanced polyphase condition of the motor to single phase condition thereof.

5. In a printing press control system and the like, in combination, a source of polyphase current, a motor having a polyphase primary winding including a plurality of terminals for connecting it to said source, and a secondary winding, a space discharge device having a control element for varying its impedance interposed between said source and one of said terminals, means for impressing upon said control element an alternating potential whose frequency is that of said polyphase current, means affording a potential which varies with the speed of said motor, means to superimpose a resultant of said varying potential upon said alternating potential to vary the impedance of said device in response to the speed of said motor, a variable impedance connected to said secondary winding, and means to vary said impedance in response to said varying potential.

6. In a printing press control system and the like, in combination, a source of polyphase current, a motor having a polyphase primary winding including a plurality of terminals for connecting it to said source, a space discharge device having a control element for varying its impedance interposed between said source and one of said terminals, means for impressing upon said control element an alternating potential whose frequency is that of said polyphase current, means affording a potential which varies with the speed of said motor, and means to superimpose a resultant of said varying potential upon said alternating potential for varying the phase angle between the latter and the voltage impressed upon said device by said source to vary the impedance of said device in response to the speed of said motor.

7. In a printing press control system and the like, in combination, a source of polyphase current, a motor having a polyphase primary winding including a plurality of terminals for connecting it to said source, a space discharge device having a control element for varying its impedance interposed between said source and one of said terminals, a phase shifting network connected to said source and to said control element to impress a potential upon the latter, means affording a voltage which varies with the speed of said motor, and means to impress upon said phase shifting network a resultant of said varying voltage to vary the impedance of said device in response to the speed of said motor.

8. In a printing press control system and the like, in combination, a source of polyphase current, a motor having a polyphase primary winding including a plurality of terminals for connecting it to said source, a single pair of space discharge devices connected inversely parallel to each other between one phase of said source and one of said terminals, each of said devices having a control electrode for varying its impedance, and means to impress upon said control electrodes a potential varying in response to the speed of said motor to thereby control the current passing through said devices.

9. In a printing press control system and the like, in combination, a source of polyphase current, a motor having a polyphase primary winding including a plurality of terminals for connecting it to said source and a secondary winding, a pair of space discharge devices connected inversely parallel to each other and interposed between said source and one of said terminals, each of said devices having a control electrode for varying its impedance, a variable impedance connected to said secondary winding, means to impress upon said control electrodes a potential varying in response to the speed of said motor to thereby control the current passing through said devices, and means to vary said impedance in response to said varying potential.

10. In a printing press control system and the like, in combination, a source of polyphase current, a motor having a polyphase primary winding including a plurality of terminals for connecting it to said source, two space discharge devices, each having a control electrode for varying its impedance, means to connect said terminals to said source and to interpose one of said devices between said source and one of said terminals, commutating means connecting the other of said devices inversely parallel with said one device for operating said motor as a prime mover and operative to alternatively disconnect said other device from circuit and to connect two of said terminals to said source with said one device interposed between said one terminal and said source for supplying a rectified current to said winding for dynamic braking of said motor, and means to impress upon said control electrodes a potential varying in response to the speed of said motor to thereby control the current passing through said devices.

11. In a control system for a translating device, in combination, a source of alternating current, a translating device having a winding including a plurality of terminals for connecting it to said source to receive current therefrom, space discharge means interposed between said source and one of said terminals, a variable impedance device connected between said one and another one of said terminals, and means for varying the impedance of said impedance device in accordance with the voltage drop through said discharge means.

12. In a printing press control system and the like, in combination, a source of polyphase current, a motor having a polyphase primary winding including a plurality of terminals for connecting it to said source, space discharge means having a control element for varying the impedance thereof interposed between said source and one of said terminals, means to impress upon said control element a potential varying in response to the speed of said motor to thereby control the current passing through said space discharge means, a variable impedance device connected between said one and another one of said terminals, and means for varying the impedance of said impedance device in accordance with the voltage drop through said space discharge means.

13. In a printing press control system and the like, in combination, a source of polyphase current, a motor having a polyphase primary winding including a plurality of terminals for connecting it to said source, a space discharge device having a control element for varying its impedance interposed between said source and one of said terminals, a phase shifting network connected to said source and to said control electrode to impress a control potential upon the latter, means affording a voltage which varies with the speed of said motor, means to impress upon said phase shifting network a resultant of said varying voltage to vary the impedance of said discharge device in response to the speed of said motor, a variable impedance device connected between said one and another one of said terminals, and means for varying the impedance of said impedance device in accordance with the voltage drop through said space discharge device.

14. In a printing press control system and the like, in combination, a source of polyphase current, a motor having a polyphase primary winding including a plurality of terminals for connecting it to said source, a pair of space discharge devices connected inversely parallel to each other and interposed between one of said terminals and said source, each of said discharge devices having a control electrode, means affording a potential which varies with the speed of said motor, manual slow speed and high speed means for connecting said terminals to said source and interposing said space discharge devices between said source and one of said terminals, said manual means including means affording different ratios between said varying potential and the motor speed for initiating operation of said motor at relatively high running speeds and at a relatively low threading speed selectively, and means to impress said varying potential upon said control electrodes to thereby control the current passing through said devices.

15. In a printing press control system and the like, in combination, a source of polyphase current, a motor having a polyphase primary winding including a plurality of terminals for connecting it to said source, a first space discharge device, a second space discharge device, each of said devices having a control electrode for varying its impedance, means to impress upon said control electrodes a potential varying in response to the speed of said motor to thereby control the current passing through said devices, manual starting means operative to connect said winding through said terminals to said source and to interpose said first space discharge device between said source and one of said terminals for starting and running, and including means to connect said second space discharge device inversely parallel to said first space discharge device, and manual stopping means operative to disconnect said second space discharge device from circuit and render said starting means ineffective to thereby afford dynamic braking.

WILLIAM H. ELLIOT.

REFERENCES CITED

The following references are of record in the file of this patent:

UNITED STATES PATENTS

| Number | Name | Date |
| --- | --- | --- |
| 1,376,453 | Meyer | May 3, 1921 |
| 1,914,350 | Evans | June 13, 1933 |
| 2,386,581 | Wicherham | Oct. 9, 1945 |